US010996486B2

(12) United States Patent
Oh et al.

(10) Patent No.: US 10,996,486 B2
(45) Date of Patent: May 4, 2021

(54) LAMP FOR VEHICLE

(71) Applicant: SL Corporation, Daegu (KR)

(72) Inventors: Seung Ju Oh, Gyeongsan-Si (KR); Jae Sun Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/553,689

(22) Filed: Aug. 28, 2019

(65) Prior Publication Data

US 2020/0209637 A1 Jul. 2, 2020

(30) Foreign Application Priority Data

Dec. 27, 2018 (KR) ................. 10-2018-0170924

(51) Int. Cl.
| | |
|---|---|
| *F21S 43/245* | (2018.01) |
| *G02B 30/00* | (2020.01) |
| *F21V 5/04* | (2006.01) |
| *F21V 8/00* | (2006.01) |
| *F21W 104/00* | (2018.01) |
| *F21S 43/50* | (2018.01) |

(52) U.S. Cl.
CPC ............. *G02B 30/00* (2020.01); *F21V 5/04* (2013.01); *G02B 6/0011* (2013.01); *F21S 43/245* (2018.01); *F21S 43/50* (2018.01); *F21W 2104/00* (2018.01)

(58) Field of Classification Search
CPC ............ F21S 41/24; F21S 41/26; G02B 30/00
See application file for complete search history.

(56) References Cited

U.S. PATENT DOCUMENTS

| | | | | |
|---|---|---|---|---|
| 6,637,923 B2 * | 10/2003 | Amano | ............... | B60Q 1/2607 362/545 |
| 2009/0073721 A1 * | 3/2009 | Kamikatano | ............. | F21V 7/05 362/616 |
| 2009/0126792 A1 * | 5/2009 | Gruhlke | ............. | H01L 31/0547 136/259 |
| 2009/0185389 A1 * | 7/2009 | Tessnow | ............. | G02B 6/0038 362/516 |
| 2010/0202153 A1 * | 8/2010 | Schwab | ............. | G02B 6/0038 362/520 |
| 2011/0080554 A1 * | 4/2011 | Toko | ................... | G02F 1/13471 349/193 |
| 2012/0268940 A1 * | 10/2012 | Sahlin | ................... | F21S 43/255 362/290 |
| 2014/0159636 A1 * | 6/2014 | Yang | ..................... | H01L 31/055 320/101 |
| 2015/0078025 A1 * | 3/2015 | Kleiner | ................... | F21S 41/24 362/511 |
| 2016/0215950 A1 * | 7/2016 | Ender | ..................... | B60Q 1/30 |
| 2016/0252226 A1 * | 9/2016 | Shih | ....................... | F21S 41/24 362/511 |
| 2017/0059106 A1 * | 3/2017 | Sato | ....................... | F21S 41/24 |
| 2017/0219178 A1 * | 8/2017 | Faffelberger | .......... | F21S 43/239 |

(Continued)

*Primary Examiner* — Zheng Song
(74) *Attorney, Agent, or Firm* — Nelson Mullins Riley & Scarborough LLP; Kongsik Kim, Esq.

(57) ABSTRACT

A lamp for a vehicle capable of forming a beam pattern is provided. The lamp for a vehicle includes a light source and a first lens unit in which a first image shape is formed inside thereof. An optic or an etched portion is formed on the first image shape of the first lens unit, and light emitted from the light source is discharged to an outside along the first image shape.

17 Claims, 9 Drawing Sheets

(56) References Cited

U.S. PATENT DOCUMENTS

| | | | |
|---|---|---|---|
| 2018/0313505 A1* | 11/2018 | Gao | F21S 43/14 |
| 2019/0049088 A1* | 2/2019 | Sakashita | F21S 43/247 |
| 2019/0285242 A1* | 9/2019 | Horikawa | G02B 6/0036 |
| 2019/0391321 A1* | 12/2019 | Ortega | F21S 43/239 |
| 2020/0173626 A1* | 6/2020 | Jo | B60Q 1/2696 |

* cited by examiner

LAMP FOR VEHICLE

CROSS-REFERENCE TO RELATED APPLICATION

This application claims the benefit of priority from Korean Patent Application No. 10-2018-0170924 filed on Dec. 27, 2018, which application is herein incorporated by reference in its entirety.

BACKGROUND

1. Technical Field

The present disclosure relates to a lamp for a vehicle, and more particularly to a lamp for a vehicle having a three-dimensional light emission image.

2. Description of the Related Art

Generally, a vehicle is equipped with various types of lamps having an illumination function for easily confirming an object disposed in the vicinity of the vehicle in low light conditions (e.g., nighttime driving), and a signaling function for notifying other vehicles or road users of the operating state of the vehicle.

For example, the vehicle is mainly equipped with a head lamp and a fog lamp for the purpose of illumination function, and a turn signal lamp, a tail lamp, a brake lamp, side markers for signaling functions, or the like. These lamps for the vehicle are stipulated by laws and regulations for their installation standards and specifications so that each function can be fully utilized.

Recently, attempts have been made to develop a lamp for a vehicle having a specific design, rather than a conventional light source form. These attempts continue through the use of multiple light sources or through the control of multiple reflectors. When a plurality of light sources are pixelized to implement a specific design, the required number of light sources is excessive depending on the required design, which causes a problem of a significant increase in cost.

SUMMARY

Aspects of the present disclosure provide a lamp for a vehicle that implements a three-dimensional light emission image. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a light source and a first lens unit in which a first image shape is formed inside thereof. An optic or an etched portion may be formed on the first image shape of the first lens unit, and light emitted from the light source may be discharged to an outside along the image shape.

According to another aspect of the present disclosure, a lamp for a vehicle may include a light source, a first lens unit in which a first image shape is formed inside thereof, and a second lens unit in which a second image shape is formed inside thereof. The first lens unit and the second lens unit may be formed to overlap when viewed from the outside of the lamp, and the first image shape of the first lens unit and the second image shape of the second lens unit may have different slopes from each other, thereby generating a three-dimensional light emission image.

According to the vehicle lamp of the present disclosure, at least one of the following effects may be obtained. Various light emitting images may be implemented based on the image shape of the lens, and the light emitting surface of the lens may be formed in two or more surfaces to implement a three-dimensional light emitting image. The effects of the present disclosure are not limited to the above-described effects, and other effects which are not described herein will become apparent to those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements. In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Exemplary embodiments of the present disclosure are described herein with reference to plan and cross-section illustrations that are schematic illustrations of exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, a lamp for a vehicle according to exemplary embodiments of the present disclosure will be described with reference to the drawings.

Figure 1:
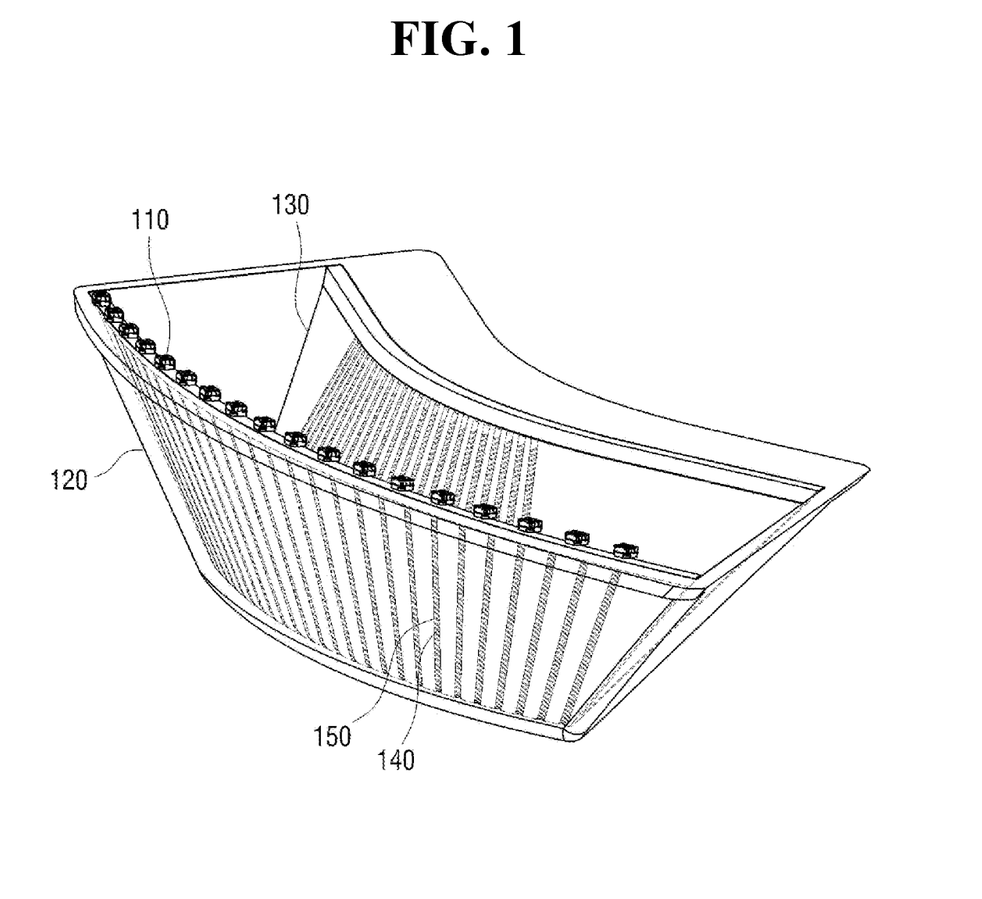
FIG. 1 is a perspective view of a lens of a lamp for a vehicle according to an exemplary embodiment of the present disclosure.

FIG. 1 is a perspective view of a lens of a lamp for a vehicle according to an exemplary embodiment of the present disclosure. The lamp for the vehicle according to an exemplary embodiment of the present disclosure may include a light source 110, a first lens unit 120, and a second lens unit 130, and may further include a reflecting plate, a bezel, and an outer lens.

The light source 110 may emit light to an inner lens that includes the first lens unit 120 and the second lens unit 130. The light emitted to the inner lens may form a light emission image on the inner lens and may be discharged to the outside. Particularly, an LED may be used as the light source 110. However, the present disclosure is not limited thereto, and a general light source or another light source may be used.

Figure 2A:
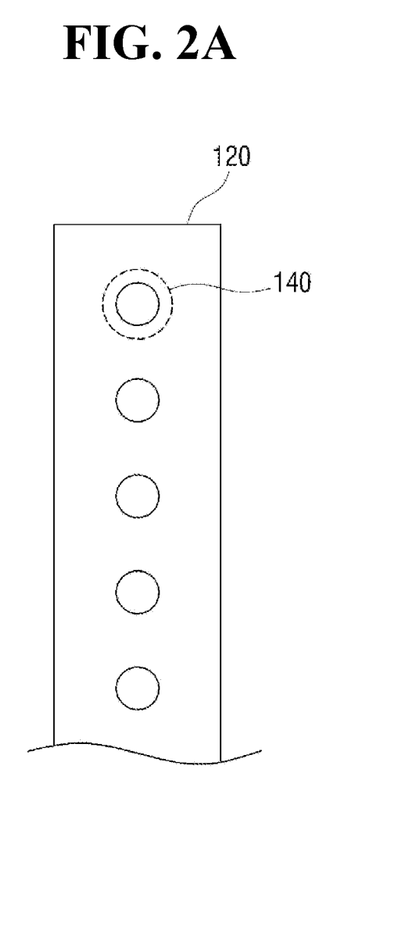
FIGS. 2A and 2B are top views of a lens forming an image shape of a lamp for a vehicle according to an exemplary embodiment of the present disclosure.

The inner lens may include a first lens unit 120 in which one or more image shapes are formed inside the lens to form a lamp having a light emission image. The first lens unit 120 may form an image shape 140 in one lens as shown in FIG. 2A. The image shape may be implemented as various forms of image shapes. Various images such as linear or curved lines may be implemented. In forming a linear image, the image shape may be formed in one or more optical fiber shapes. The optical fiber shape may refer to a thin and long shape like a fiber. In other words, it may be a shape having a predetermined thickness and a long shape, and a cross-sectional shape thereof may be circular or elliptical. Further, it may have various cross-sectional shapes such as a polygon or a rectangle. The image shape may be implemented by forming an empty space of a groove (e.g., cavity) inside the lens. However, the present disclosure is not limited thereto, and the image shape may be implemented in various images in addition to the optical fiber shape.

Alternatively, the image shape may be implemented by a light guide. A plurality of light guides may be integrally formed to form a lens having an image shape. The light guide may cause light to be totally reflected in the longitudinal direction and induce the light to be transmitted. The light may be discharged to the outside through an optic formed in the light guide. Herein, the optic may refer to a refractive element or an optical diffuser.

Figure 2B:
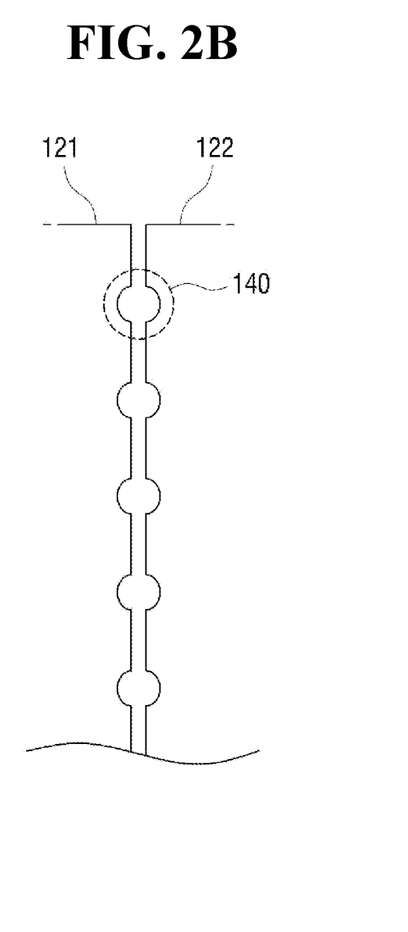

As shown in FIG. 2B, the image shape inside the lens may be formed by using two lenses instead of one lens. In order to form an image shape 140 using two lenses, the first lens unit 120 may include two lenses 121 and 122, in which the two lenses 121 and 122 are in surface contact with each other to form the image shape, and contacting surfaces of the two lenses are engraved. Additionally, the first lens unit 120 may include three or more lenses depending on the light emission image to be implemented.

The two lenses 121 and 122 constituting the first lens unit 120 may be formed of a transparent plate having a predetermined thickness and function as a light guide plate for emitting light. The lenses 121 and 122 of the first lens unit 120 may be formed of clear lenses. Further, they may have a thickness that is greater than the depth at which the image shapes and optics are formed to allow the image shapes and optics to be formed therein.

An inner space of the image shape may be formed such that two lenses in surface contact are used to form the light emission image. In other words, in order to implement the image shape, the inside may be formed to be hollow in the image shape. The inner space of the image shape may be formed by engraving the surfaces of the two lenses 121 and 122 which are in contact with each other. The image shape may be formed by engraving each of the two lenses separated through the general injection. The inner space having the image shape may form an engraved semi-circular shape at positions that correspond to the mutually contacting surfaces of the lenses 121 and 122 of the first lens unit. When the engraved semi-circular shapes are brought into contact with each other at corresponding positions, an inner space having an image shape may be formed.

An optic 150 or etched portion may be formed on the image shape 140 formed on the first lens unit 120, and the light emitted from the light source 110 may be discharged to the outside along the image shape. The optic 150 may form a circular groove that is deeper than the depth of the image shape in a direction perpendicular to the longitudinal direction of the image shape along the image shape. The etched portion may refer to the surface that is treated to be roughened. When an etch treatment is performed, the lens at the corresponding position may be machined and fogged.

Figure 3:
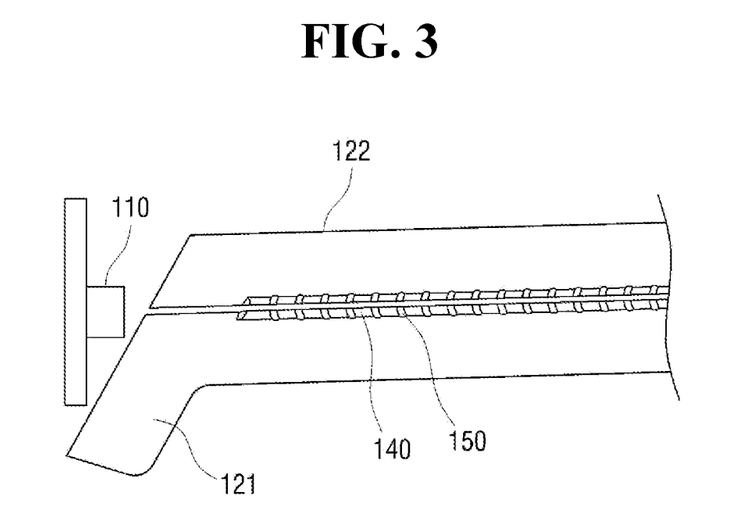
FIGS. 3 and 4 illustrate cross-sectional views of an image shape of a lens of a lamp for a vehicle and light moving paths according to an exemplary embodiment of the present disclosure.
Figure 4:
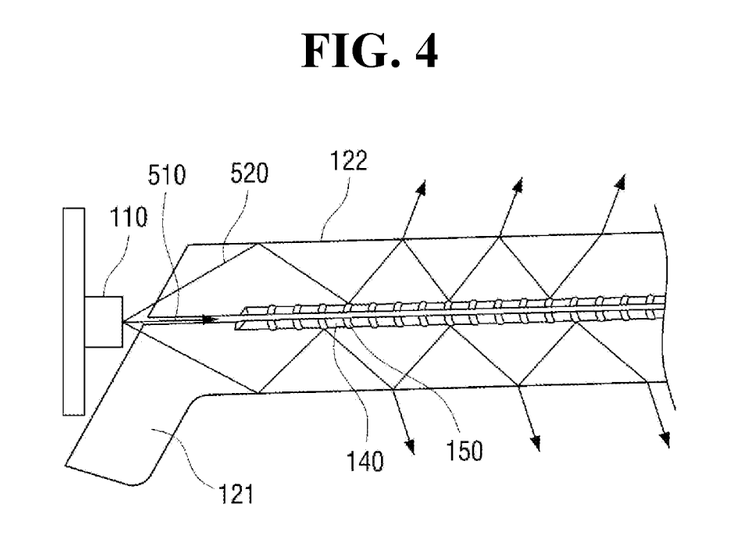

The cross-section of the structure in which the two lenses 121 and 122 of the first lens unit 120 are in contact with each other may be formed as shown in FIG. 3. The optic 150 or etched portion may be formed in the inner space of the image shape formed between the lenses 121 and 122 of the first lens unit 120. As shown in FIG. 4, the light emitted from the light source 110 may enter (as shown by arrow 510) the image shape 140 or may enter (as shown by arrows 520) the two lenses 121 and 122 that serve as a light guide plate of a discharging unit. Light that transmits along the image shape 140 and light that transmits by total reflection through the two lenses 121 and 122 may be discharged to the outside through the optic 150 or the etched portion formed in the image shape 140. During the transmission, the light may arrive at the position where the optic 150 or the etched portion is formed and may be discharged to the outside.

Figure 5A:
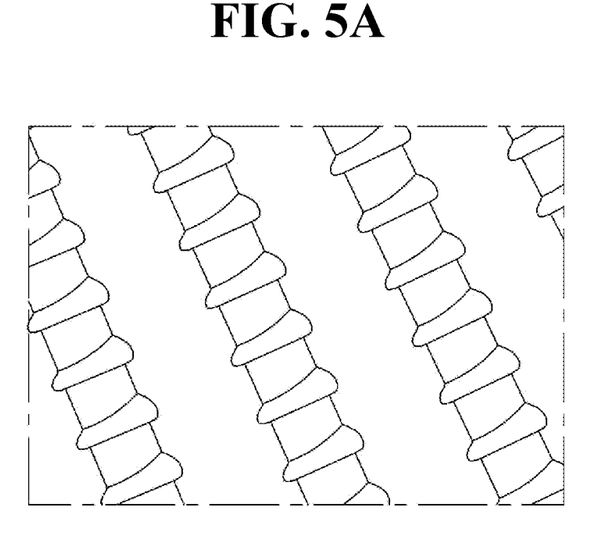
FIGS. 5A and 5B illustrate an optic according to an exemplary embodiment of the present disclosure.
Figure 5B:
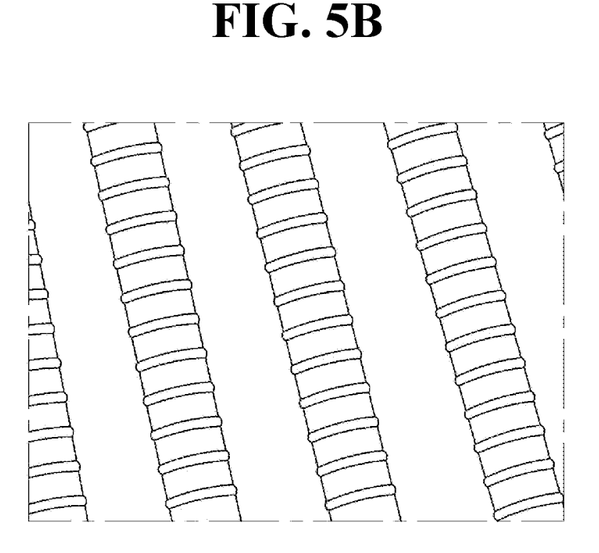

The optic 150 or the etched portion may be formed at regular intervals along the image shape. As shown in FIGS. 5A and 5B, the optic 150 may be formed at regular intervals along the image shape. As the light is emitted from the optic 150, the optic 150 or the etched portion may be formed at regular intervals to form a uniform linear image. When the brightness is implemented to be different based on a position in the image to be implemented, the interval of the optic 150 or the etched portion may be varied based on the image to be implemented.

A shape or a depth of the optic 150 may be varied based on the required light amount and/or design specifications. Further, based on the shape and the depth of the optic 150, the degree of light emission may vary. Therefore, the shape and the depth may be varied based on the required light amount and/or the image or the design specification to be implemented as shown in FIGS. 5A and 5B. Various images may be implemented by forming different shapes and depths to implement the optic 150.

Figure 6:
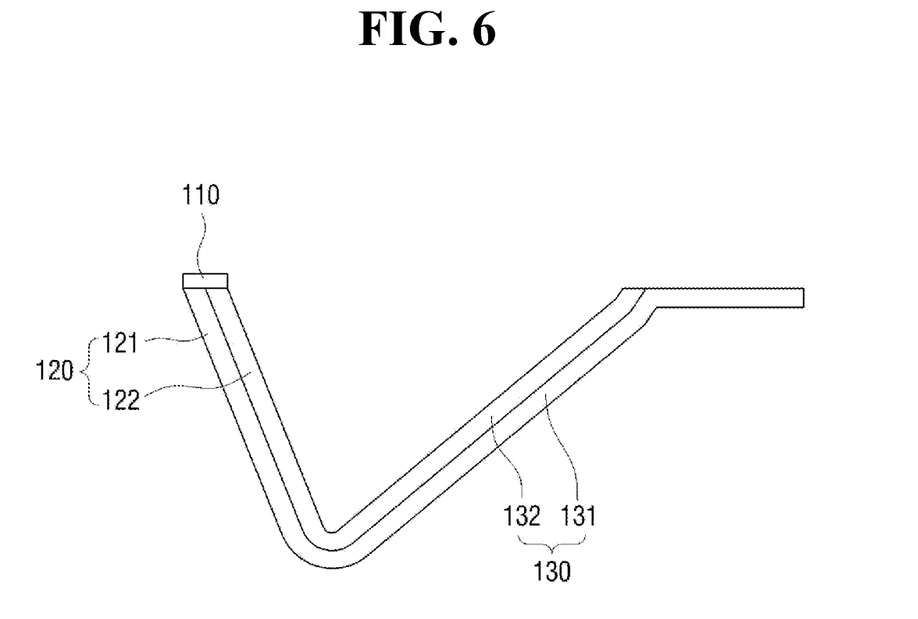
FIG. 6 is a side sectional view of a lens of a lamp for a vehicle according to an exemplary embodiment of the present disclosure.

The light source 110 may be disposed above the image shapes, as shown in FIGS. 1 and 6. The light source 110 may be disposed on an image shape of one lens unit of the image shape of the first lens unit 120 or the image shape of the second lens unit 130. Further, the light source 110 may be disposed on the image shapes of both lens units. The light emitted from the light source 110 may be transmitted along the image shape formed in the first lens unit 120 and/or the second lens unit 130. Therefore, the light efficiency may be increased by disposing the light source 110 on the image shape of the first lens unit 120 or on the image shape of the second lens unit 130. When the first lens unit 120 or the second lens unit 130 includes two lenses, the light source 110 may be disposed on a surface where the two lenses are in contact with each other.

The light source 110 may include a plurality of light sources based on the number of image shapes formed. One light source may be provided for all image shapes, or one light source may be provided for each of a plurality of image shapes. The number of light sources may vary based on the required light amount according to the lamp design or the required light source to implement the light emission image.

The lamp for a vehicle may further include a second lens unit 130 in which an image shape is formed inside the lens. The first lens unit 120 and the second lens unit 130 may be formed to overlap (e.g., overlay or be superimposed) when viewed from the outside (e.g., front) of the lamp. In other words, the lamp may include two lenses, a front lens and a rear lens, that are visible when viewed from the outside of the lamp. As shown in FIG. 6, the first lens unit 120 and the second lens unit 130 may be configured that one end of the first lens unit 120 and one end of the second lens unit 130 are connected to each other. Therefore, the image formed on the first lens unit 120 and the image formed on the second lens unit 130 may be connected to each other.

Figure 7A:
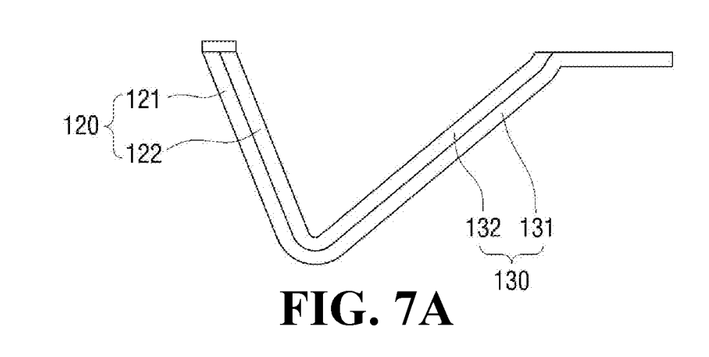
FIGS. 7A and 7D are views for explaining a three-dimensional light emission image implemented by a lens of a lamp for a vehicle according to an exemplary embodiment of the present disclosure.

As shown in FIG. 7A, a lower lens 121 of the two lenses 121 and 122 of the first lens unit 120 and a lower lens 131 of the two lenses 131 and 132 of the second lens unit 130 may be connected to each other, and an upper lens 122 of the two lenses 121 and 122 of the first lens unit 120 and an upper lens 132 of the two lenses 131 and 132 of the second lens unit 130 may be connected to each other, thereby implementing a single lens that is bent in substantially a V-shape. Ends of the lower lens and the upper lens may be connected to allow them to be also connected at the point where the image shape between the two lenses is bent. Therefore, the lower lens and the upper lens may be implemented as a round shape at the point where they are bent.

Figure 7B:
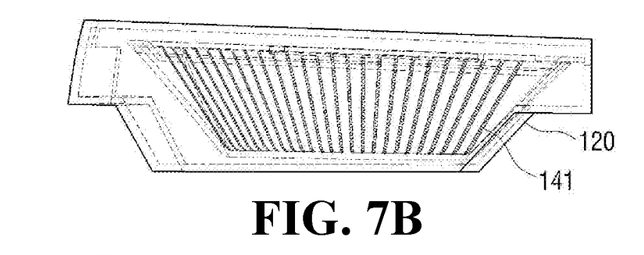
Figure 7C:
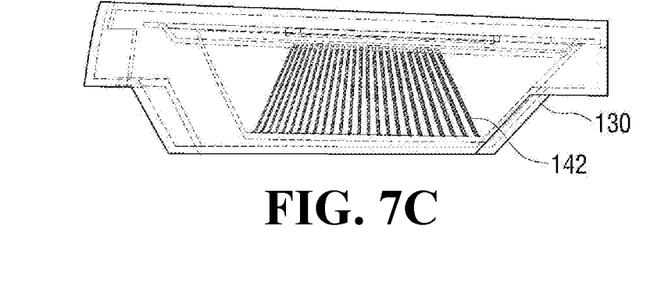

In particular, the image shape formed on the first lens unit 120 and the image shape formed on the second lens unit 130 may have different slopes with respect to each other. An image shape 141 of the first lens unit 120 may be formed in a shape that spreads outward as it goes from the bottom toward the top, as shown in FIG. 7B. An image shape 142 of the second lens unit 130 may be formed in a shape that spreads outward as it goes from the top toward the bottom, as shown in FIG. 7C. The shapes of the first lens unit 120 and the second lens unit 130 may be opposite to each other. However, the configuration shown in FIGS. 7A-7D is only an example and it may be implemented in various shapes for implementing various images. They may have different slopes from each other and may have different depths of emission.

Figure 7D:
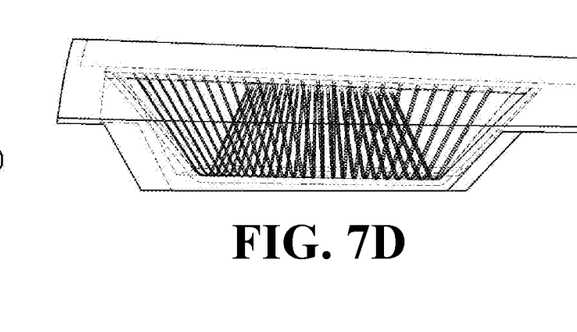

Therefore, as shown in FIG. 7D, the light being discharged to the outside may appear to have a depth, and a three-dimensional image may be generated. When the image shape 141 of the first lens unit 120 and the image shape 142 of the second lens unit 130 are formed with same slopes, it may be difficult to obtain the three-dimensional image since the image shapes overlap each other. Accordingly, the three-dimensional image may be generated by forming the image shape 141 of a front surface and the image shape 142 of a rear surface to prevent the image shapes from overlapping each other. Alternatively, the lamp for a vehicle according to exemplary embodiments of the present disclosure may be implemented by a single first lens unit 120 when the three-dimensional image is not generated.

In case the first lens unit 120 and the second lens unit 130 are formed to overlap when viewed from the outside of the lamp, the second lens unit 130 may be implemented in various forms. The second lens unit 130 may include a groove in one lens to form an image shape. Alternatively, an image shape may be formed using two lenses instead of one lens. In order to form an image shape using two lenses, the second lens unit 130 may include two lenses, in which the two lenses are in surface contact with each other to form the image shape. The contacting surfaces of the two lenses may be engraved. In other words, the second lens unit 130 may include two lenses that form engraved image shapes that correspond to the first lens unit 120. Alternatively, the image shape may be formed by the light guide.

Further, the second lens unit 130 may be configured as one lens having one engraved surface to form the image shape. The second lens unit 130 may include one lens having an image shape different from the first lens unit 120. Particularly, the engraved surface of the lens of the second lens unit 130 may be in contact with a reflecting plate.

Figure 8:
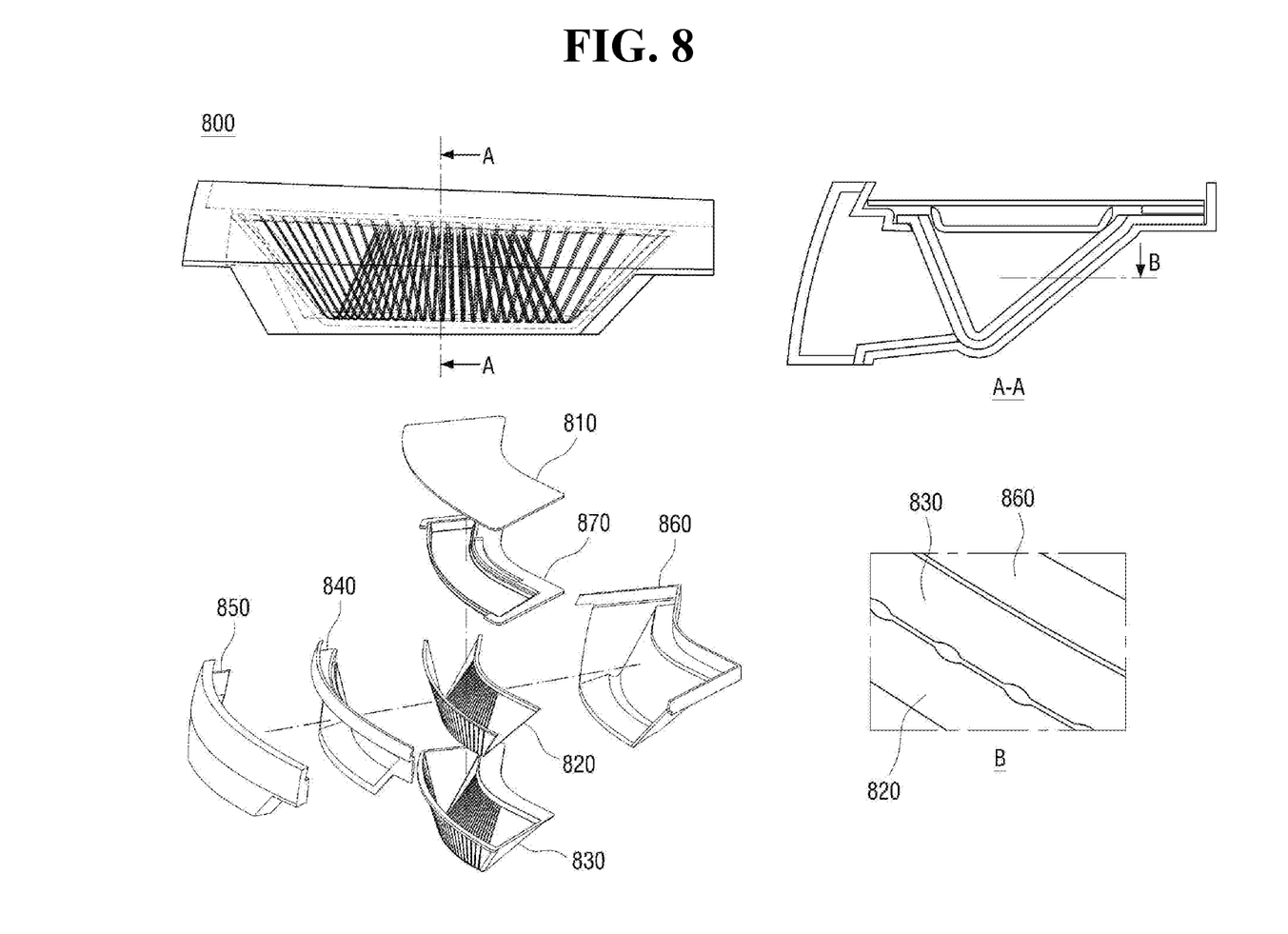
FIGS. 8 and 9 illustrate a lamp for a vehicle according to an exemplary embodiment of the present disclosure.
Figure 9:
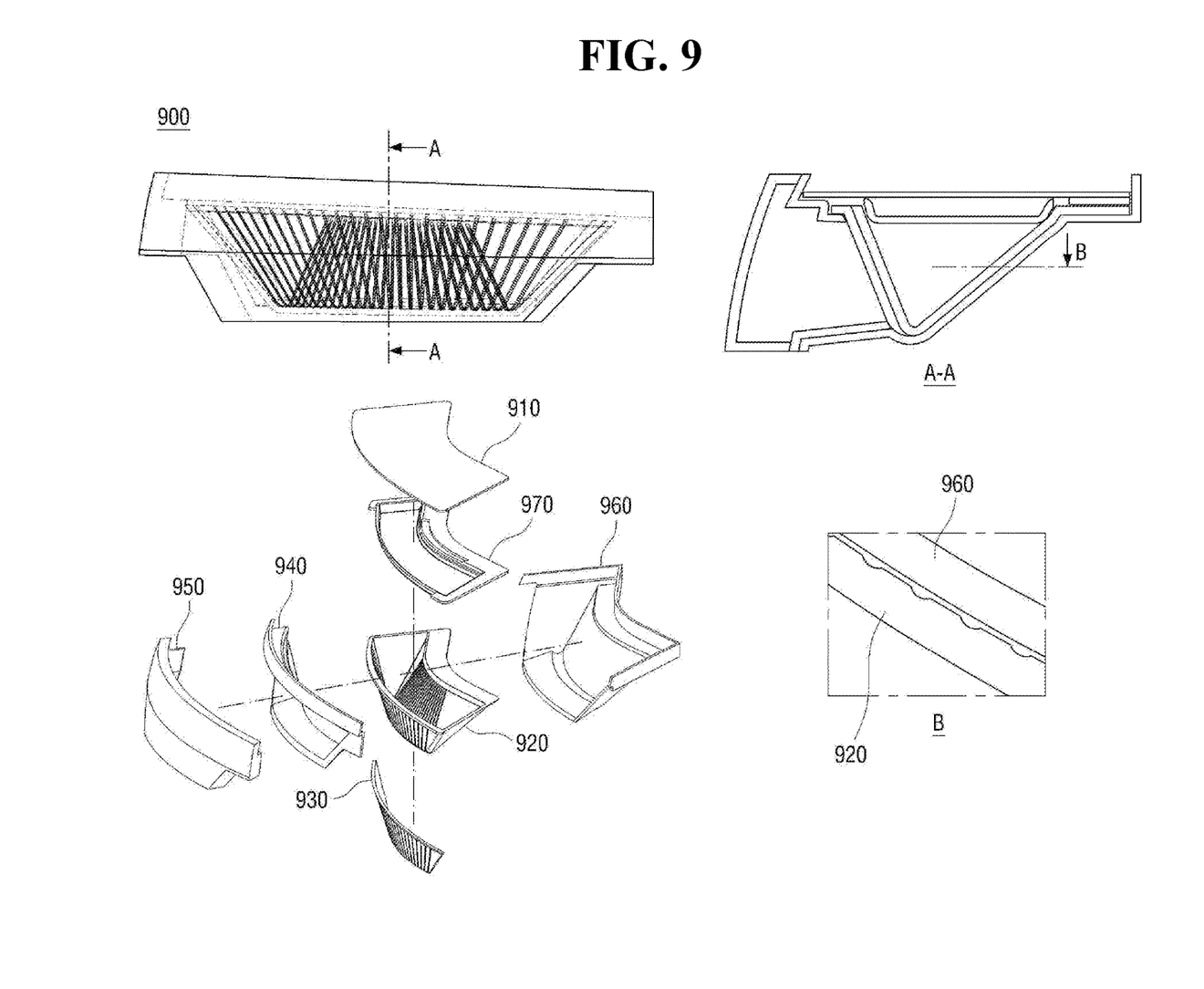

The lamp for the vehicle may be implemented as shown in FIGS. 8 and 9 depending on whether the second lens unit 130 includes two lenses or one lens. First, as shown in FIG. 8, the second lens unit may also include two lenses to correspond to the first lens unit, in which the upper lens of the first lens unit may be connected to the upper lens of the second lens unit to constitute the upper lens 820, and the lower lens of the first lens unit may be connected to the lower lens of the second lens unit to constitute the lower lens 830. A lamp 800 including an inner lens formed by overlapping a first lens unit and a second lens unit may include a light source 810, and the first lens unit and the second lens unit in which two lenses are in surface contact with each other and contacting surfaces of the two lenses are engraved to allow the two lenses to contact with each other and form an inner space of an image shape. An optic or etched portion may be formed on the image shape of the first lens unit and the second lens unit, and the light emitted from the light source may be discharged to the outside along the image shape. The first lens unit and the second lens unit may be formed to overlap (e.g., overlay or be superimposed) when viewed from the outside of the lamp. The image shape formed on the first lens unit and the image shape formed on the second lens unit may have different slopes from each other, thereby generating a three-dimensional light emission image.

Further, the lamp 800 may further include a bezel 840 that generates an image by light discharged from the first lens unit and the second lens unit and prevents unnecessary light from being discharged. An outer lens 850 may protect the inner lens and transmit the light discharged from the inner lens to the outside, and a reflecting plate 860 may be formed on a rear surface of the first lens and the second lens to allow the light discharged from the first lens unit and the second lens unit to be directed to a discharging surface. A light source bracket 870 may position the light source 810 above the first lens unit.

A cross-section A-A of the lamp 800 may have a shape in which one end of the first lens unit and one end of the second lens unit are connected. When a cross section B is viewed in detail, the image shape and the optic may be formed on the surface where the two lenses 820 and 830 of the second lens unit overlap and contact. The reflecting plate 860 may be disposed on a rear surface of the two lenses 820 and 830 of the second lens unit.

Alternatively, the second lens unit may include one lens as shown in FIG. 9. Referring to FIG. 8, the second lens unit may include two lenses, and the second lens unit may include an upper lens and a lower lens, respectively, that correspond to two lenses of the first lens. On the other hand, a lower lens 930 in FIG. 9 may be formed only in the first lens unit. The second lens unit may be configured that a surface of the lens on which the image shape is formed is in contact with a reflecting plate 960.

A lamp 900 may include an inner lens in which the first lens unit includes two lenses and the second lens unit includes one lens. The lamp 900 may include a light source 910, and the first lens unit and the second lens unit which are engraved to form an inner space of an image shape. An optic or an etched portion may be included on the image shape formed by the first lens unit and the second lens unit, and the light emitted from the light source 910 may be discharged to the outside along the image shape. The first lens unit and the second lens unit may overlap (e.g., overlay or be superimposed) when viewed from the outside of the lamp. The image shape formed on the first lens unit and the image shape formed on the second lens unit may have different slopes from each other, thereby generating a three-dimensional light emission image.

In addition, the lamp 900 may further include a bezel 940, an outer lens 950, a reflecting plate 960, and a light source bracket 970.

In a cross-section A-A of the lamp 900, the first lens unit may include two lenses, and the second lens unit may be configured with one lens. A lens of the second lens unit may be in contact with the reflecting plate 960. When a cross section B is viewed in detail, a lens 920 of the second lens unit may be in contact with the reflecting plate 960. In this case, the image shape and the optic may be formed on the upper lens 920 of the second lens unit.

Figure 10:
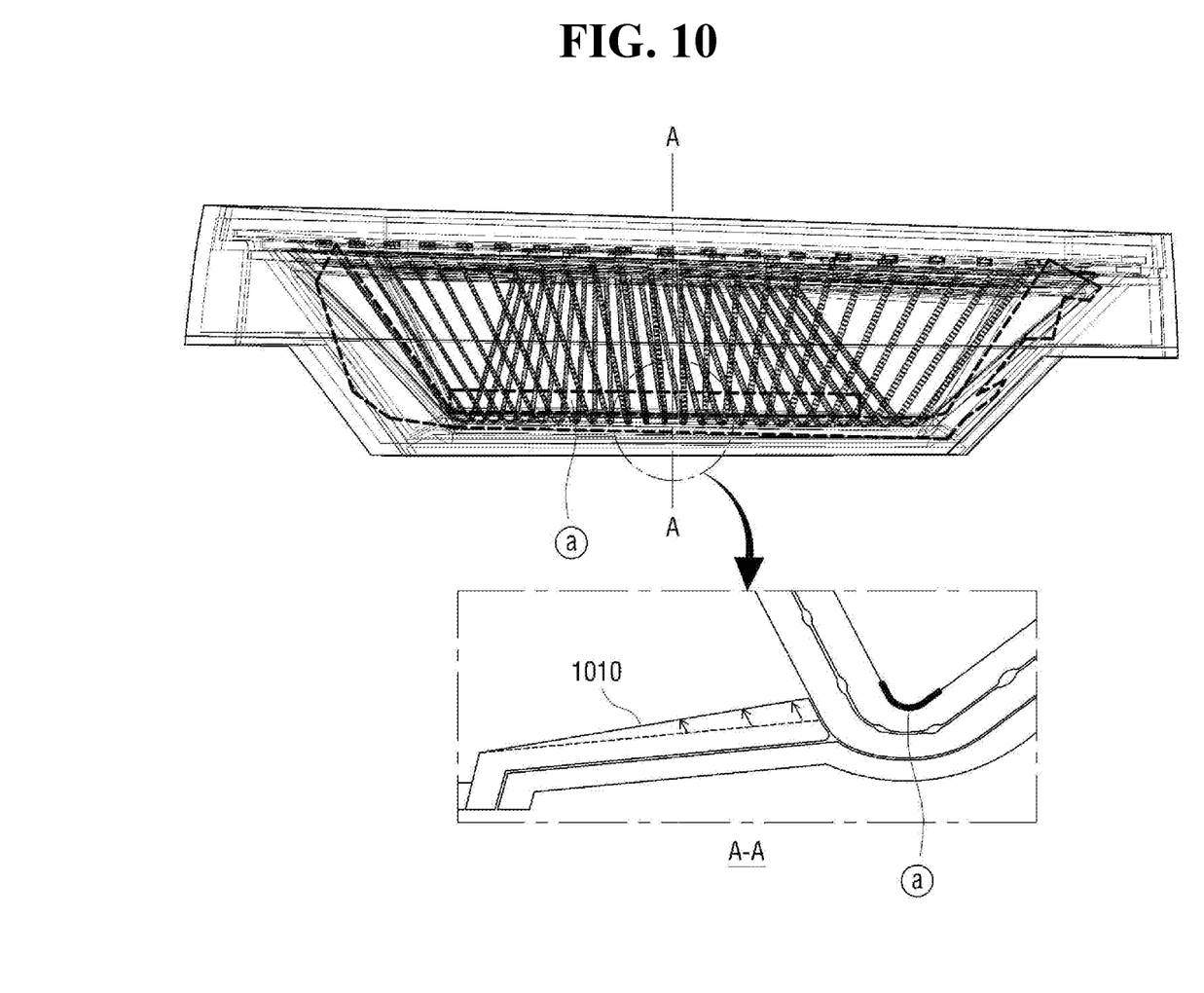
FIG. 10 is a view for explaining a bezel applied to a lamp for a vehicle according to an exemplary embodiment of the present disclosure.

FIG. 10 is a view of a bezel applied to a lamp for a vehicle according to an exemplary embodiment of the present disclosure. As described above, the bezel may provide an image to be realized by the light discharged from an inner lens and may prevent unnecessary light from being discharged. When one end of the first lens unit 120 and one end of the second lens unit 130 are connected to each other, more light may be discharged at a position where the first lens unit 120 and the second lens unit 130 are connected than other positions. Therefore, at the position (a), light may be discharged more brightly than other positions, and light-grain-like patterns may be generated. In order to prevent this, the bezel for obstructing light discharged to the outside may be formed at a position where the first lens unit 120 and the second lens unit 130 are connected. For this purpose, as shown in FIG. 10, a position of an end of a bezel 1010 may be raised upward to allow the position where the first lens unit 120 and the second lens unit 130 are connected to be unexposed (e.g., obstructed from view) to the outside. As a result, at a certain position, light is prevented from being emitted brighter than other positions, and an image to be implemented may be more clearly formed.

In concluding the detailed description, those skilled in the art will appreciate that many variations and modifications may be made to the exemplary embodiments without substantially departing from the principles of the present disclosure. Therefore, the disclosed exemplary embodiments of the present disclosure are used in a generic and descriptive sense only and not for purposes of limitation.

What is claimed is:

1. A lamp for a vehicle comprising:
   a light source;
   a first lens unit in which a first image shape is formed inside thereof; and
   a second lens unit in which a second image shape is formed inside thereof,
   wherein the first lens unit and the second lens unit are formed to overlap when viewed from an outside of the lamp,
   wherein an optic or an etched portion is formed on the first image shape of the first lens unit, and light emitted from the light source is discharged to the outside along the first image shape,
   wherein the first lens unit comprises two lenses, the two lenses being in surface contact with each other and contacting surfaces of the two lenses being engraved to form the first image shape, and
   wherein the second lens unit comprises two lenses, the two lenses being in surface contact with each other and contacting surfaces of the two lenses being engraved to form the second image shape.

2. The lamp for the vehicle of claim 1, wherein the second lens unit comprises one lens having an engraved surface to form the second image shape.

3. The lamp for the vehicle of claim 2, wherein the engraved surface of the one lens of the second lens unit is in contact with a reflecting plate.

4. The lamp for the vehicle of claim 1, wherein the light source is disposed above the first image shape of the first lens unit.

5. The lamp for the vehicle of claim 1, wherein the first image shape of the first lens unit is a light guide.

6. The lamp for the vehicle of claim 1, wherein the first image shape of the first lens unit and the second image shape of the second lens unit have different slopes from each other.

7. The lamp for the vehicle of claim 1, further comprising:
   a bezel for obstructing the light discharged to the outside at the position where the first lens unit and the second lens unit are connected.

8. The lamp for the vehicle of claim 1, wherein the optic or the etched portion is formed at regular intervals along the first image shape.

9. The lamp for the vehicle of claim 1, wherein the first image shape is one or more optical fiber shapes.

10. The lamp for vehicle of claim 1, wherein one end of the first lens unit and one end of the second lens unit are connected to each other, the first image shape of the first lens unit and the second image shape of the second lens unit are connected to each other and bent, and the first lens unit and the second lens unit are connected to each other at a position where the first image shape and the second image shape are connected and bent.

11. A lamp for a vehicle comprising:
a light source;
a first lens unit in which a first image shape is formed inside thereof; and
a second lens unit in which a second image shape is formed inside thereof, wherein the first lens unit and the second lens unit are formed to overlap when viewed from an outside of the lamp,
wherein the first image shape of the first lens unit and the second image shape of the second lens unit have different slopes from each other, thereby generating a three-dimensional light emission image,
wherein the slopes of the first image shape and the second image shape are formed in opposite directions to each other,
wherein the first lens unit comprises two lenses, the two lenses being in surface contact with each other and contacting surfaces of the two lenses being engraved to form the first image shape, and
wherein the second lens unit comprises two lenses, the two lenses being in surface contact with each other and contacting surfaces of the two lenses being engraved to form the second image shape.

12. The lamp for the vehicle of claim 11, wherein the first image shape of the first lens unit, the second image shape of the second lens unit, or both are a light guide.

13. The lamp for the vehicle of claim 11, wherein the second lens unit comprises one lens having an engraved surface to form the second image shape, the engraved surface of the one lens being in contact with a reflecting plate.

14. The lamp for vehicle of claim 11, wherein light emitted from the light source travels through the first lens unit, a first portion of the light is discharged to the outside along the first image shape, and a second portion of the light enters the second lens unit and is discharged to the outside along the second image shape.

15. A lamp for a vehicle comprising:
a light source;
a first lens unit in which a first image shape is formed inside thereof; and
a second lens unit in which a second image shape is formed inside thereof,
wherein the first lens unit and the second lens unit are formed to overlap when viewed from an outside of the lamp,
wherein the first image shape of the first lens unit and the second image shape of the second lens unit have different slopes from each other, thereby generating a three-dimensional light emission image,
wherein the slopes of the first image shape and the second image shape are formed in opposite directions to each other,
wherein the first lens unit comprises two lenses, the two lenses being in surface contact with each other and contacting surfaces of the two lenses being engraved to form the first image shape, and
wherein the second lens unit comprises one lens having an engraved surface to form the second image shape, the engraved surface of the one lens being in contact with a reflecting plate.

16. The lamp for vehicle of claim 15, wherein the first image shape of the first lens unit, the second image shape of the second lens unit, or both are a light guide.

17. The lamp for vehicle of claim 15, wherein light emitted from the light source travels through the first lens unit, a first portion of the light is discharged to the outside along the first image shape, and a second portion of the light enters the second lens unit and is discharged to the outside along the second image shape.

* * * * *